United States Patent
Kerr et al.

(10) Patent No.: US 8,109,551 B2
(45) Date of Patent: Feb. 7, 2012

(54) BUS CABIN STRUCTURE

(75) Inventors: Andrew Kerr, Winnipeg (CA); Glen Naylor, Winnipeg (CA); Paul Cantin, Lorette (CA); Tomasz Cychowski, Winnipeg (CA); Kristopher Egilson, Winnipeg (CA); Jordan Fast, Winnipeg (CA)

(73) Assignee: New Flyer Industries Canada ULC, Winnipeg (CA)

( * ) Notice: Subject to any disclaimer, the term of this patent is extended or adjusted under 35 U.S.C. 154(b) by 248 days.

(21) Appl. No.: 12/365,769

(22) Filed: Feb. 4, 2009

(65) Prior Publication Data
US 2009/0195015 A1 Aug. 6, 2009

(51) Int. Cl.
*B62D 25/20* (2006.01)
(52) U.S. Cl. .................. 296/25; 296/193.07; 296/65.04; 296/178; 296/210
(58) Field of Classification Search .......... 296/178, 296/179, 193.01, 193.04, 193.07, 37.13, 296/191, 204, 25, 65.04, 61, 210; 414/537, 414/522, 921
See application file for complete search history.

(56) References Cited

U.S. PATENT DOCUMENTS

| | | | |
|---|---|---|---|
| 2,853,934 A * | 9/1958 | Hohmann | 454/94 |
| 3,926,100 A * | 12/1975 | Bermanseder et al. | 454/108 |
| 3,989,119 A | 11/1976 | Cady | |
| 4,114,712 A | 9/1978 | Finta | |
| 4,167,286 A | 9/1979 | Geyer | |
| 4,203,623 A | 5/1980 | Fenner et al. | |
| 4,254,987 A | 3/1981 | Leonardis | |
| 4,534,442 A | 8/1985 | Botar | |
| 5,029,936 A * | 7/1991 | Gonzalez | 296/210 |
| 5,391,041 A | 2/1995 | Stanbury et al. | |
| 5,577,793 A * | 11/1996 | Kobasic | 296/146.4 |
| 6,257,652 B1 | 7/2001 | Stanton | |
| 6,340,202 B1 | 1/2002 | Stanton et al. | |
| 6,343,908 B1 | 2/2002 | Oudsten et al. | |
| 6,375,249 B1 | 4/2002 | Stanton et al. | |
| 6,397,965 B1 | 6/2002 | McFarlane et al. | |
| 6,416,116 B1 * | 7/2002 | Stanton et al. | 296/178 |
| 6,556,899 B1 | 4/2003 | Harvey et al. | |
| 6,611,739 B1 | 8/2003 | Harvey et al. | |
| 6,685,254 B2 * | 2/2004 | Emmons et al. | 296/178 |
| 6,726,271 B2 | 4/2004 | Stanton et al. | |
| 2008/0036240 A1 * | 2/2008 | Lusk et al. | 296/178 |
| 2009/0085370 A1 * | 4/2009 | Bartel et al. | 296/178 |

FOREIGN PATENT DOCUMENTS

WO  WO2004000633  12/2003

\* cited by examiner

*Primary Examiner* — Glenn Dayoan
*Assistant Examiner* — Pinel Romain
(74) *Attorney, Agent, or Firm* — Norton Rose Canada LLP

(57) ABSTRACT

Bus cabin structures including improved configurations of floors, passenger aisles and steps, interior roofs or ceilings, and door frames.

3 Claims, 9 Drawing Sheets

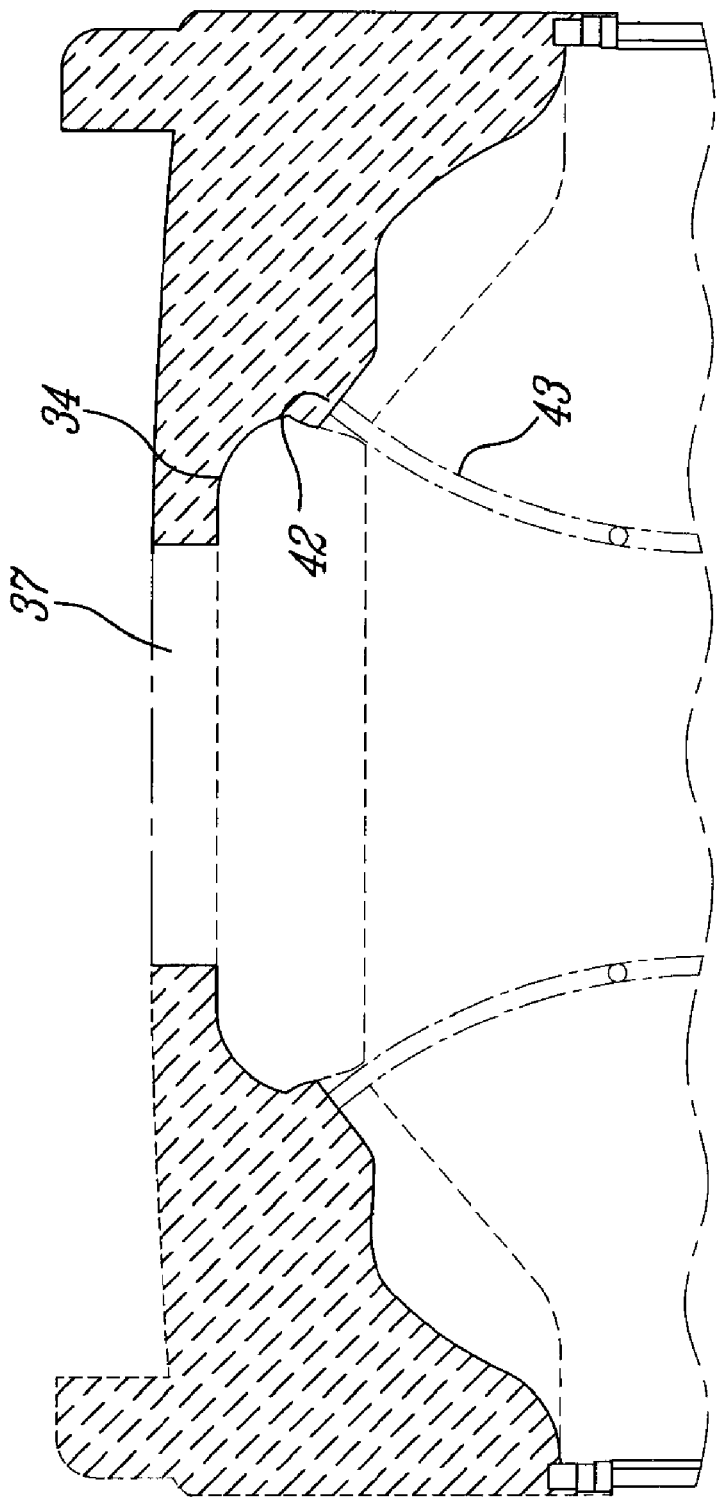

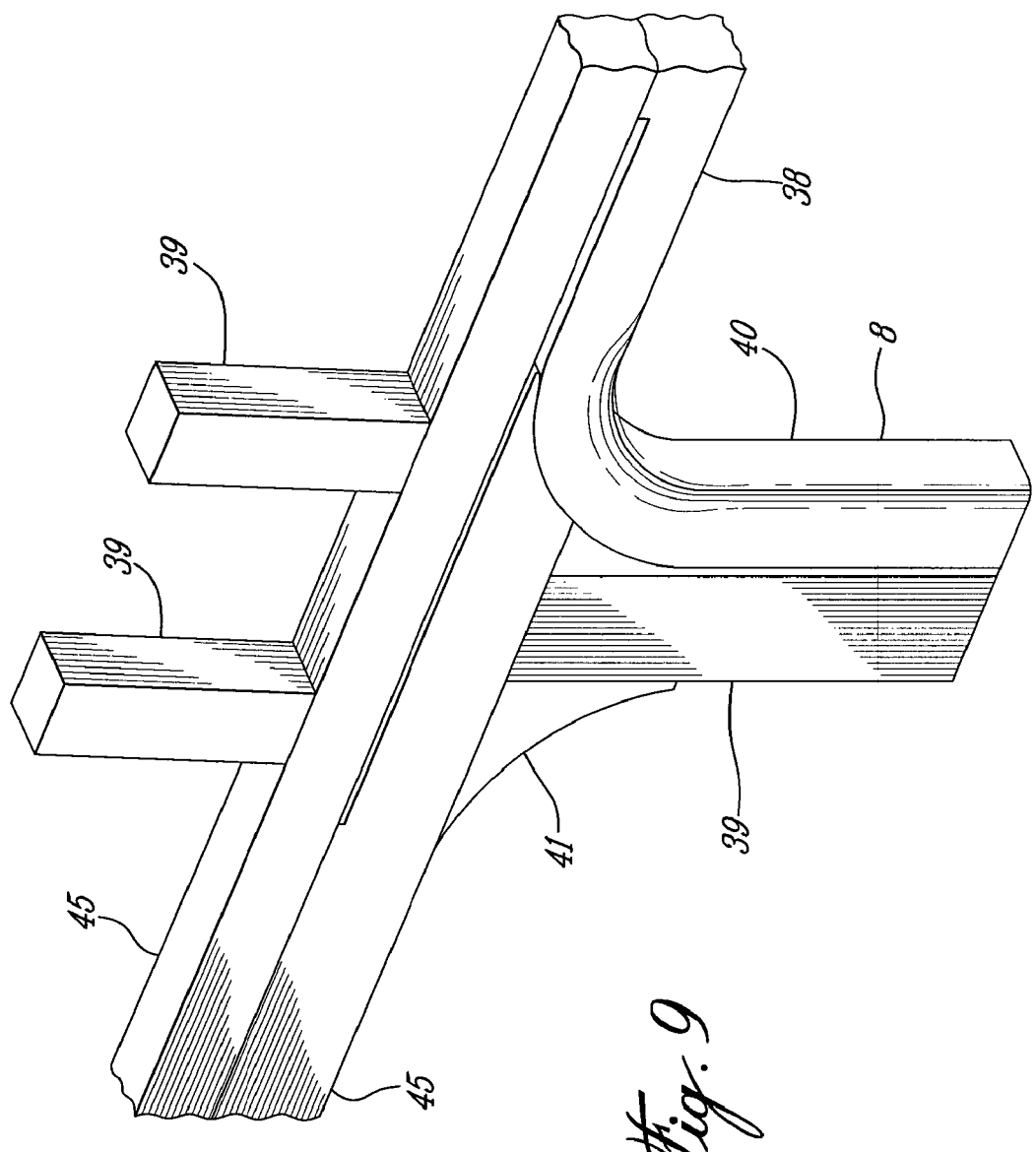

BUS CABIN STRUCTURE

TECHNICAL FIELD

The invention relates to floor and ceiling structures for transit buses and other vehicles. In particular, the invention relates to bus cabin structures having lower floors and upper floors, with transition floor modules therebetween, the transition modules having central aisles with recessed steps and angled front walls.

BACKGROUND OF THE ART

The invention relates to cabin structures for vehicles, such cabins as used in wheelchair-accessible and other transit bus cabins. To allow access by passengers in wheelchairs, and disabled, elderly, or other passengers who have difficulty with stairs, including for example passengers with wheeled baby carriages or wheeled carrying devices, buses are commonly designed with a lower front floor section.

Such floors may be made increasingly accessible when the bus stops by, for example, operating "kneeling" front suspension or lateral tipping suspension mechanisms to bring the floor adjacent the front and rear doors closer to the exterior curb elevation. Extendable ramps or lifts are also commonly used to enable wheeled access between external sidewalk surfaces and the lower, usually forward, floor of the bus cabin.

Such bus cabin floors often have front wheel wells and/or other structures projecting significantly into the cabin, with a central aisle extending axially along the bus between the front wheel wells in buses with lower floors. The rear section of the bus usually includes an upper floor section beneath which the engine and other operating equipment is installed. A foot step can be used to transition between the lower and upper floor sections. The upper floor section is generally not accessible to wheelchairs or other wheeled devices.

Due to the lower forward floor design, space for engine machinery, fuel tanks, and other bulky equipment within the bus is generally limited to beneath the rear upper floor. However, such available space may be inadequate for certain bus configurations.

The transition step between the lower and upper floor sections is generally perpendicular to the central aisle extending axially through the bus cabin. Wheelchairs, baby carriages and other wheeled devices may collide or otherwise interfere with the step and become difficult to redirect laterally out the rear doors. Typically, wheelchair passengers and those with wheeled devices such as baby carriages prefer to exit through the front doors due to difficulty in navigating out the rear doors. This impedes entry of passengers through the front doors and generally slows down transit service as a result.

Features that distinguish the present invention from the background art will be apparent from review of the disclosure, drawings and description of the invention presented below.

DISCLOSURE OF THE INVENTION

In various aspects the invention provides a bus cabin structure comprising: a floor with an axially extending central aisle, the floor comprising: a lower floor section; and an upper floor section rearward of the lower floor section; a roof, a forward wall, a rear wall, curbside wall and driverside wall, each of the walls extending between the floor and the roof, the curbside wall including a rear door; wherein the floor includes a floor transition module rearwardly adjacent the rear door joining the lower floor section and the upper floor section together, a central aisle section of the module including a recessed foot step, the module having an upper surface aligned with the upper floor section and a base aligned with the lower floor section, the module having a front wall having a curbside portion rearward of a driverside portion and an aisle portion between the curbside and driverside portions disposed at a predetermined angle thereto.

Among other advantages, the transition floor module provides increased space for bus equipment under the driverside portion which extends forwardly relative to the curbside portion. The angled aisle or step portion also increases the area of the step which improves the footing of passengers climbing or descending on steps in a moving vehicle, and also increases space for equipment underneath. The increased space provided beneath the transition module causes an equal reduction in space within the passenger cabin; however, since seats can be mounted on the upper driverside surface of the transition module, only under-seat space is reduced. This space is not normally utilized in transit buses.

Further, the angled front wall of the transition floor section provides an angled bumper to more easily redirect wheeled devices laterally after colliding axially. The angled front wall wheeled redirects devices toward the rear doors and reduces the tendency for wheeled devices to become trapped in a right angle corner after collision with the step. The reduced difficulty in exiting through the rear doors, will encourage one-way flow of all passengers from front to rear and therefore will improve the overall efficiency of all passenger movements through the bus.

In further aspects, the invention provides floors for transit buses and other vehicles, the forward portions of the lower floor sections forward of the front wheel wells including a front lateral aisle extending between a front door in the curbside wall and the central aisle, the front lateral aisle including a laterally downwardly sloping front ramp toward the front door.

In further aspects, the invention provides floors for transit buses and other vehicles in which the forward floor portion includes a transversely extending raised portion between the front wheel wells having a top surface at a level above the lower floor section, a forward ramp, and a rearward ramp, the forward and rearward ramps extending between the raised portion and the forward portion and the rearward portion of the lower floor section respectively.

In further aspects the invention provides cabin structures for transit buses and other vehicles, wherein the cabin roof upward of the upper floor section comprises a rear roof section having a central raised panel or other portion having an underside surface disposed at a higher level than an underside surface of a forward roof section.

DESCRIPTION OF THE DRAWINGS

In order that the invention may be readily understood, one embodiment of the invention is illustrated by way of example in the accompanying drawings.

FIG. 8 is a sectional view along line 8-8 of FIG. 1.

FIG. 9 is an isometric detail view of the upper-rear front door frame corner of FIG. 2.

Further details of the invention and its advantages will be apparent from the detailed description included below.

DETAILED DESCRIPTION OF PREFERRED EMBODIMENTS

Figure 1:
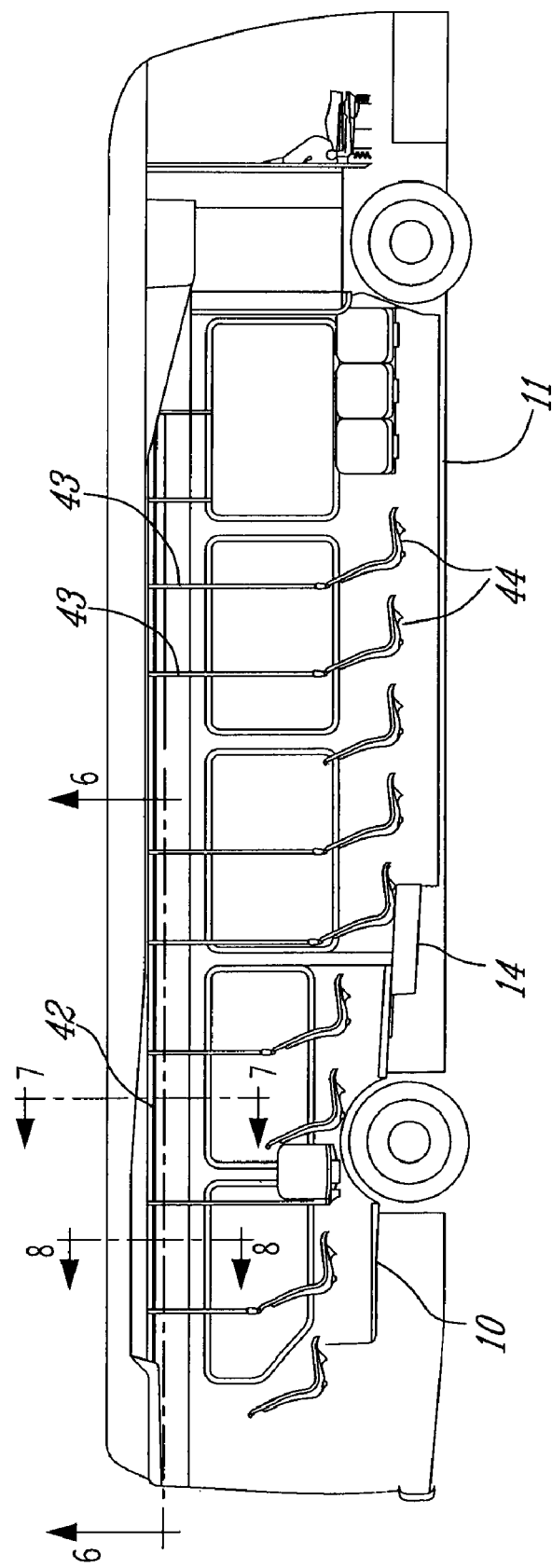
FIG. 1 is a longitudinal sectional view through a passenger bus showing the general layout of lower front floor, upper rear floor, ceiling panels, seats and stanchions mounted to the ceiling rail.

FIG. 1 shows a longitudinal sectional view of a passenger bus to illustrate the layout of the interior passenger cabin, many parts of which are commonly used and known to those skilled in the art, so only a brief description is necessary. The bus is made wheel chair accessible by having a lower front floor 11 and lower thresholds for passenger exit and entrance doors (see door locations 7, 8 in FIG. 2), with optionally axle suspension that may be actuated up and down to kneel or tilt as close as possible to the road or curb level, such as 14 inches or less. The front wheel wells protrude into the cabin and a central aisle permits passage from the front door towards the rear door. The rear portion of the floor 10 is raised to accommodate the rear axle, transmission and house other equipment. The rear portion of the floor 10 is accessible via one or more steps 14 and so is not wheel chair accessible. Seats 44 are supported with vertical stanchions 43 mounted to a longitudinal rail 42 and/or a side wall of the bus.

Figure 2:
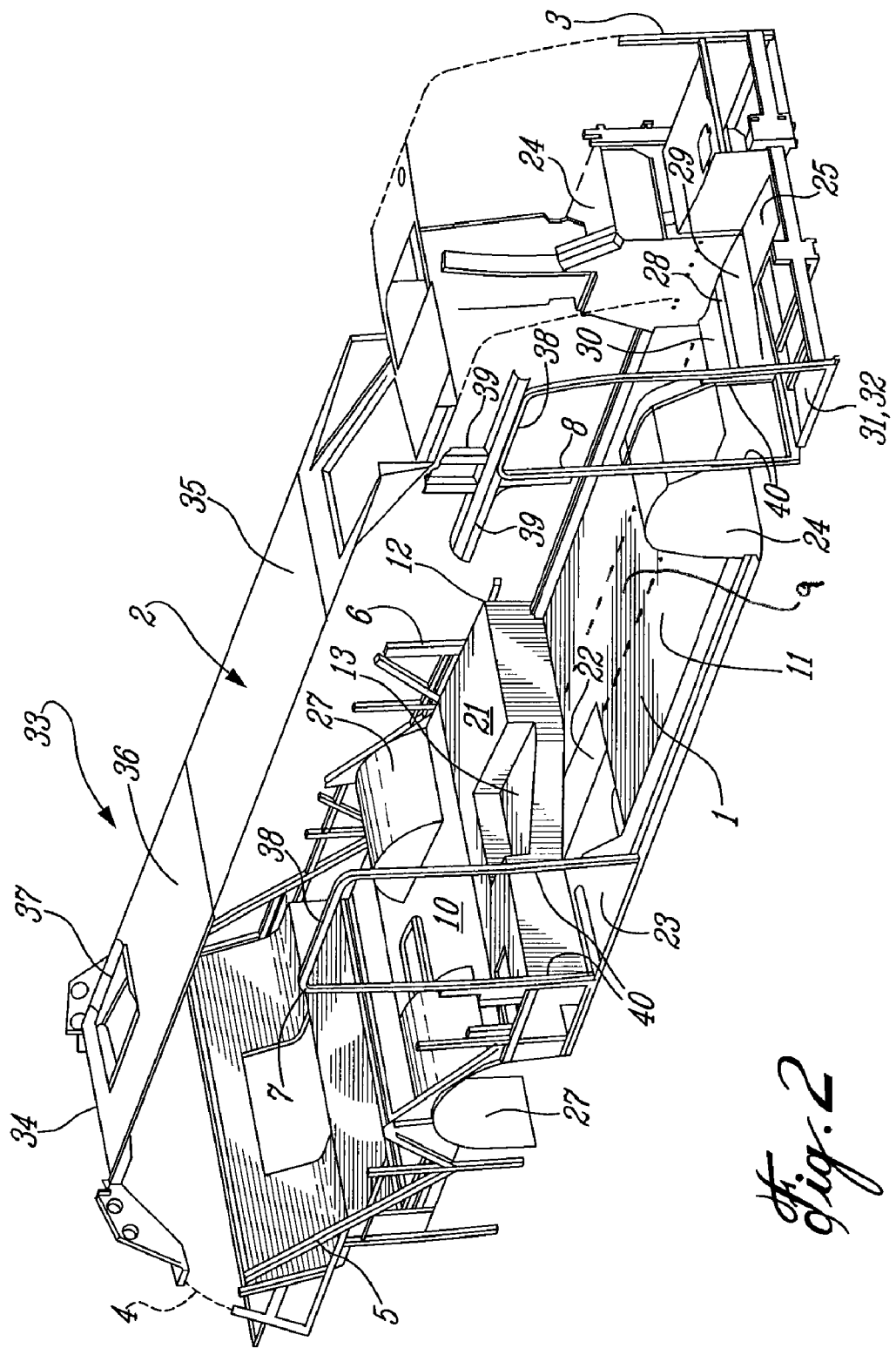
FIG. 2 is an isometric schematic view from a top curbside position showing a partial bus chassis frame with a bus cabin structure having floor, roof, and partial vertical wall structures with rear and front door frames.

FIG. 2 shows a partial bus chassis defining a bus cabin structure. Such cabins and chassis may be fabricated using any materials and processes suitable for accomplishing the purposes described herein. For example, the chassis frame may be fabricated of elongate roll-formed structural steel and/or extruded aluminium sections welded together to form the chassis base, roof and wall frames as outlined in FIG. 2. Flat roof, wall and floor panels of sheet metal or other materials are attached to the chassis frame to enclose the cabin and define the floor 1, roof 2, and vertical walls (front, rear, curbside and driverside walls 3, 4, 5, and 6) with rear and front door frames 7, 8. Other suitable materials can include fiber-based composite structures and structural plastics may also be used.

The bus cabin structure includes a floor 1 with an axially extending central aisle 9, the floor comprising: a lower floor section; and an upper floor section 10 rearward of the lower floor section 11. The cabin is bounded by the roof 2, a forward wall 3, a rear wall 4, curbside wall 5 and driverside wall 6, each of the walls extending between the floor 1 and the roof 2. The curbside wall 5 includes a rear door frame 7 within which a rear door may be mounted.

Figure 3:
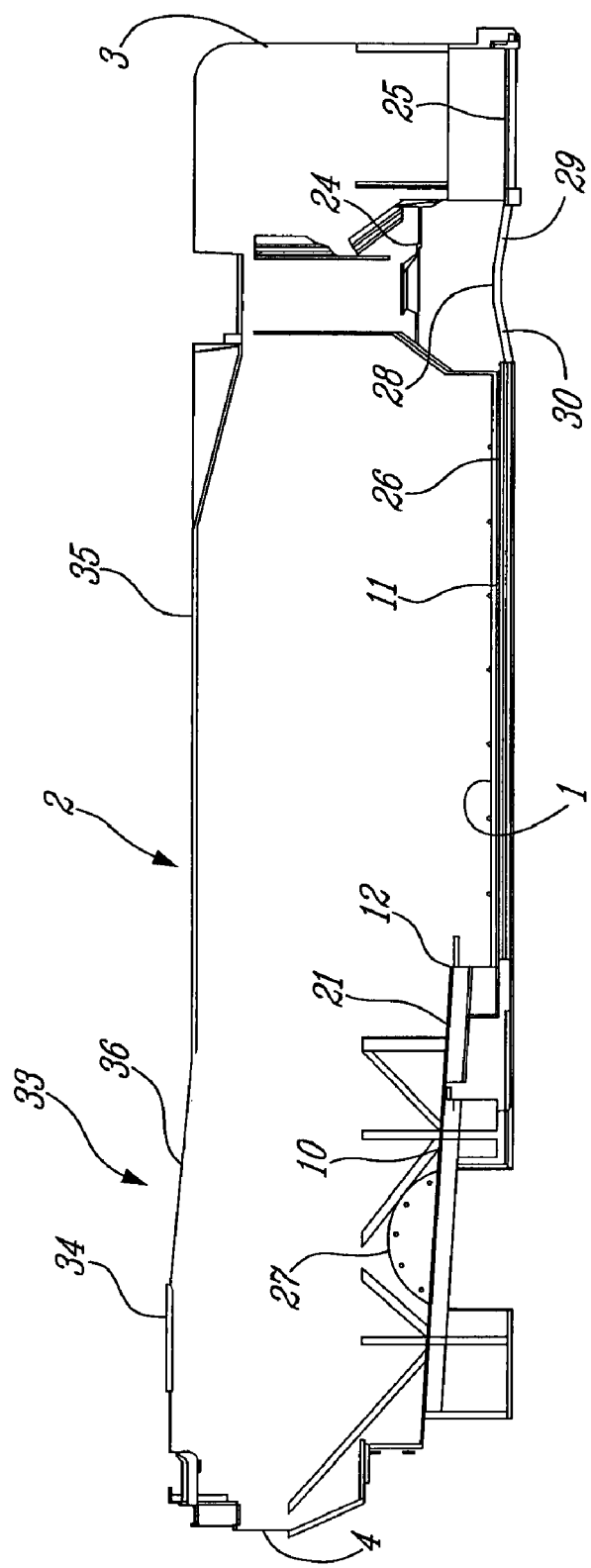
FIG. 3 is an axial centerline sectional view through the bus cabin structure of FIG. 2.
Figure 4:
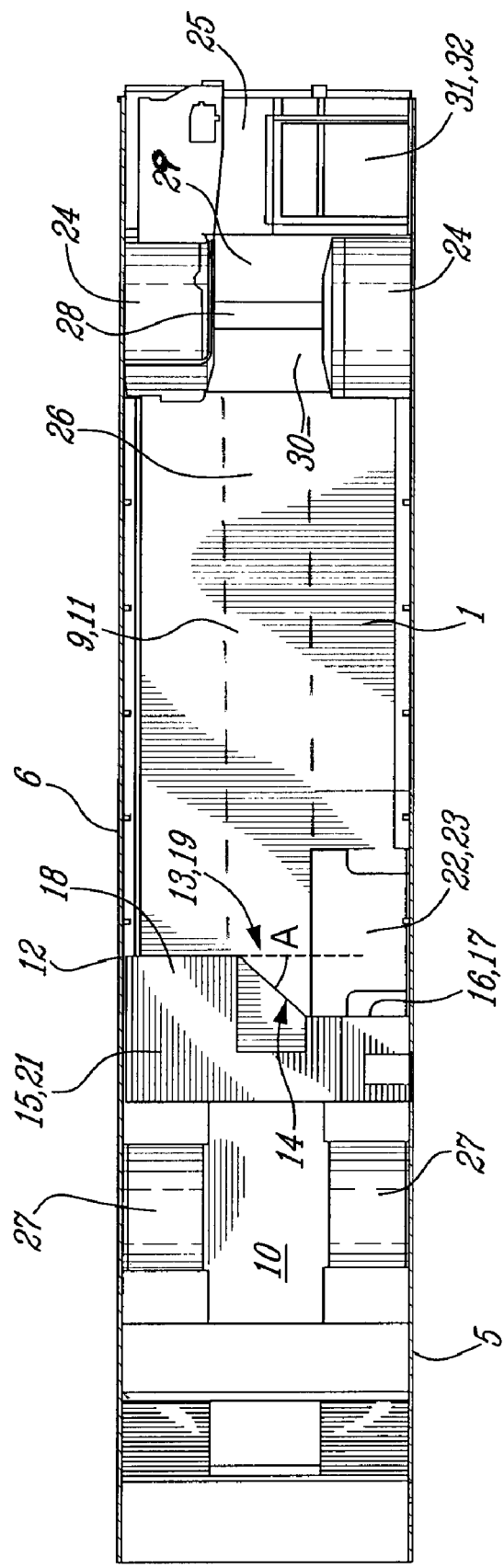
FIG. 4 is a floor plan view of the bus cabin structure shown in FIG. 2.
Figure 5:
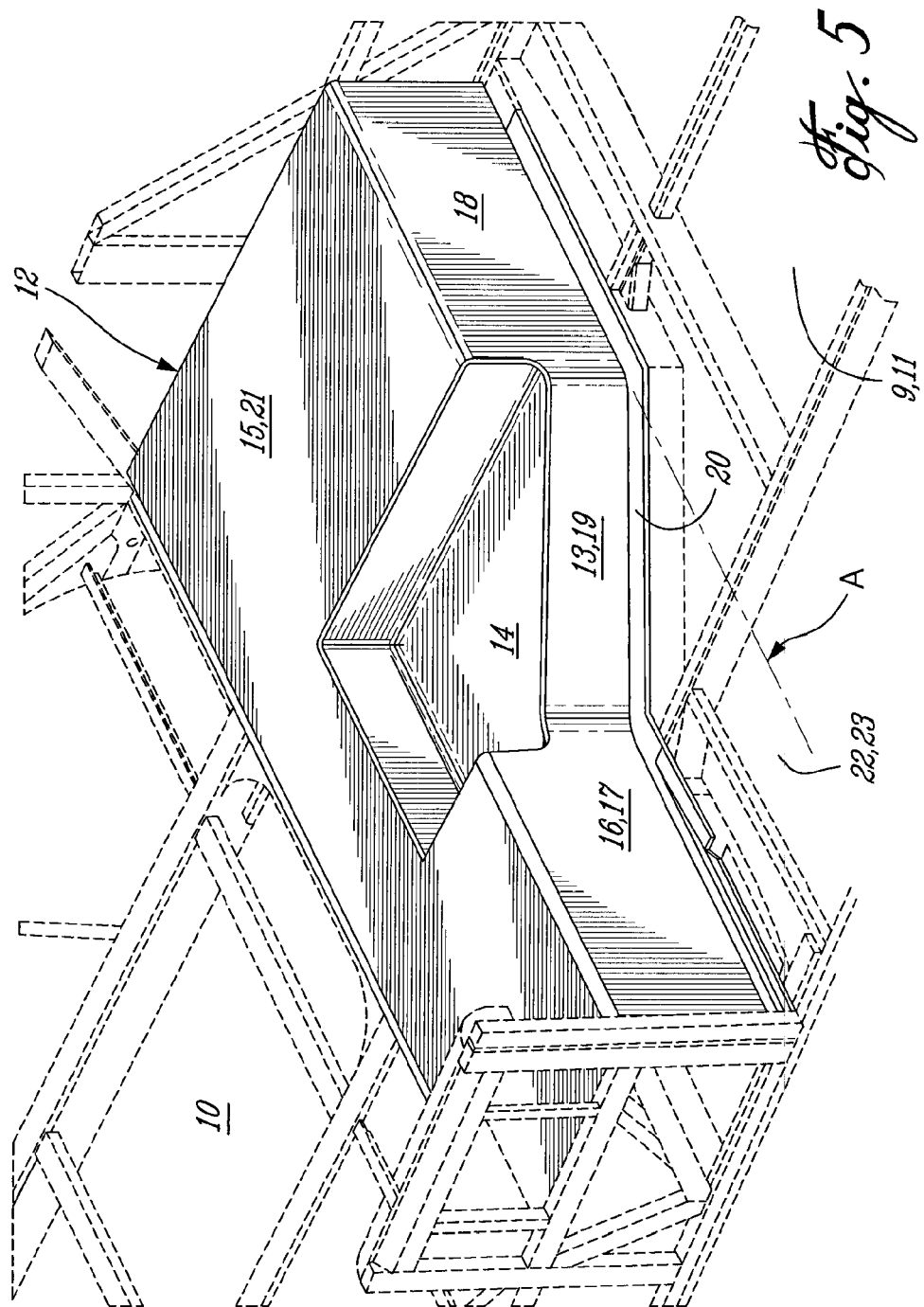
FIG. 5 is an isometric detail view from showing details of the transitional floor module of FIG. 2.
Figure 6:
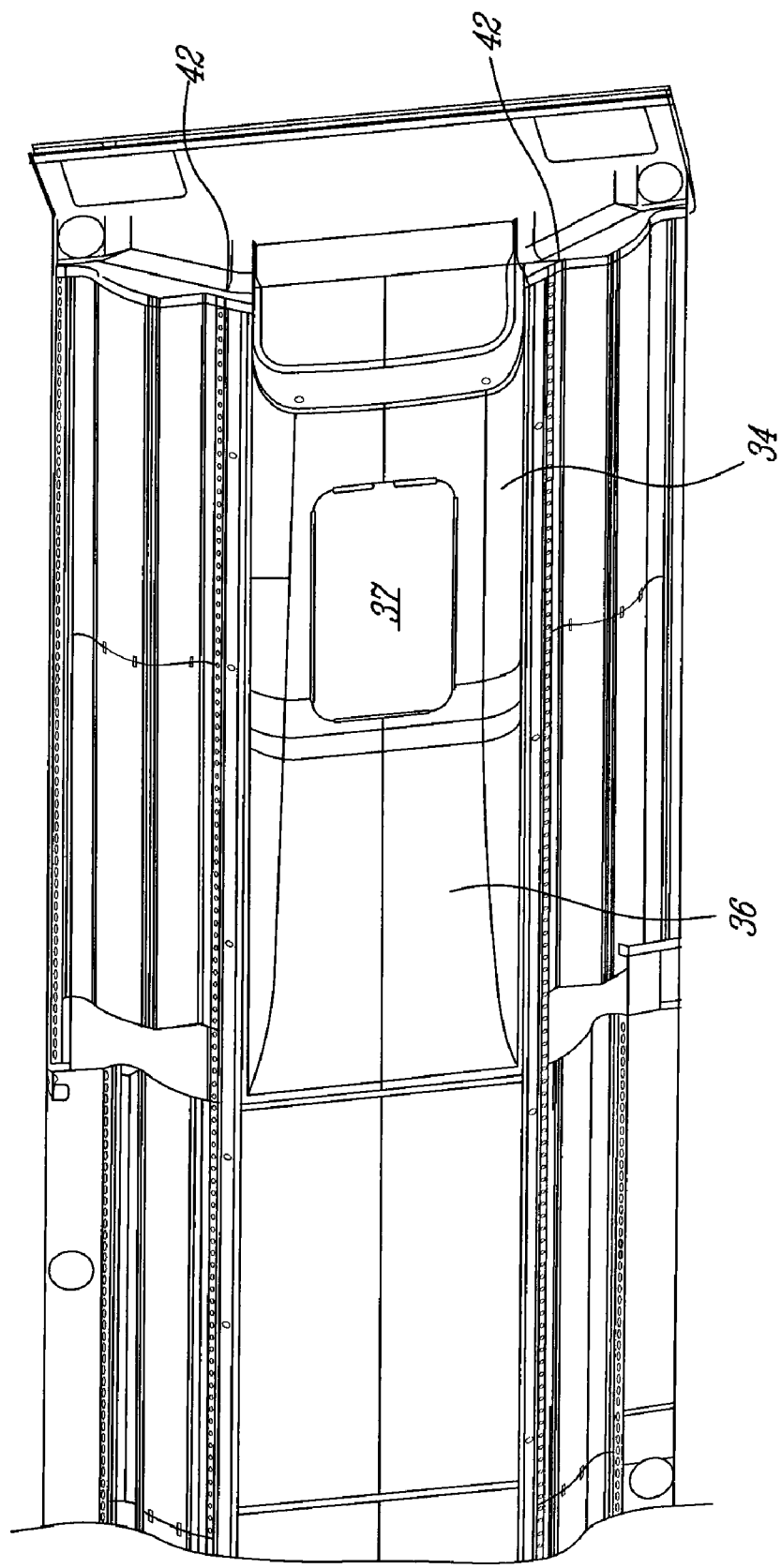
FIG. 6 is partial sectional view along line 6-6 of FIG. 1, showing the rear roof section.
Figure 7:
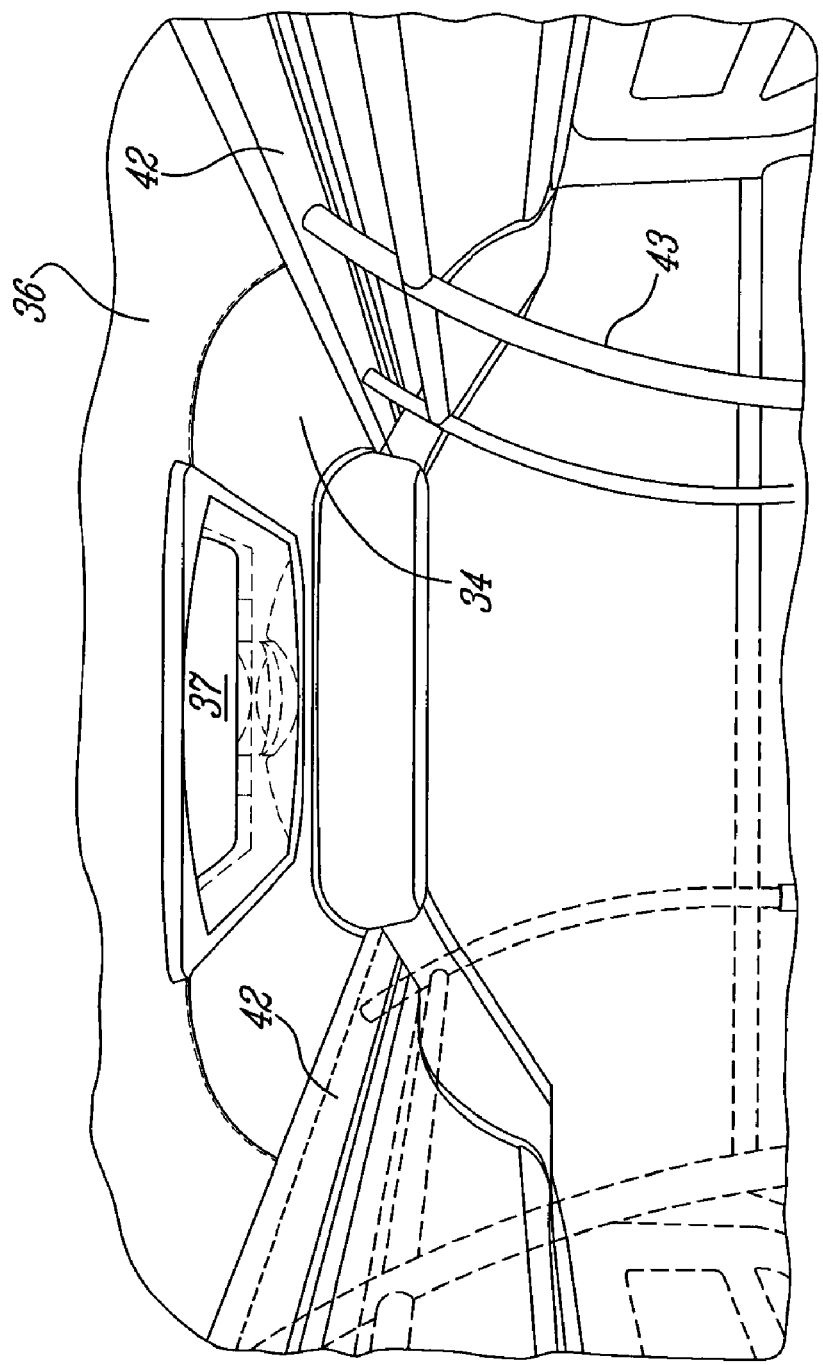
FIG. 7 is a partial perspective elevation view of the rear roof section along line 7-7 of FIG. 1.

As shown in FIGS. 3-5, the floor 1 includes a floor transition module 12 rearwardly adjacent the rear door frame 7 joining the lower floor section 11 and the upper floor section 10 together. A central aisle section 13 of the module 12 includes a recessed foot step 14. The module 12 has an upper surface 15 aligned with the upper floor section 10 and a base 16 aligned with the lower floor section 11.

The module 12 has a front wall 17 having a curbside portion 16 rearward of a driverside portion 18 and an aisle portion 19 between the curbside portion 16 and driverside portion 18 disposed at an angle "A" thereto (see FIG. 4). The angle A may be in the range of, for example, 30 to 60 degrees and as illustrated 45 degrees may be selected.

The base 20 as illustrated comprises a forwardly-extending flange and the driverside portion 18 of the front wall 17 and the upper surface 21 of the floor transition module 12 define an upper seat mounting surface.

The curbside portion 16 of the front wall 17 of the floor transition module 12 may be rearwardly adjacent the rear door frame 7. The floor transition module 12 can be molded of fiberglass or carbon fiber as a hollow molded shell, or fabricated in any other way compatible with the purposes disclosed herein.

A rear lateral aisle 22 extending between the rear door frame 7 and the central aisle 9 can include a laterally downwardly sloping rear ramp 23 toward the rear door frame 7.

In the embodiment shown, lower floor section 11 includes laterally spaced-apart front wheel wells 24 with the axially extending central aisle 9 therebetween. The lower floor section 9 has a forward portion 25 forward of the front wheel wells 24 and a rearward portion 26 rearward of the front wheel wells 24. The upper floor section 10 includes laterally spaced apart rear wheel wells 27 with the central aisle 9 extending therebetween.

In the illustrated embodiment the lower floor section 11 includes a transversely extending raised portion 28 between the front wheel wells 2 having a top surface at a level above the lower floor section 11. A forward ramp 29 and a rearward ramp 30 extending between the raised portion 28 and the forward portion 25 and the rearward portion 26 of the lower floor section 11 respectively.

The forward portion 25 of the lower floor section 11 forward of the front wheel wells 24 includes a front lateral aisle 31 extending between a front door frame 8 in the curbside wall 5 and the central aisle 9. The front lateral aisle 31 includes a laterally downwardly sloping front ramp 32 toward the front door frame 8.

As will be appreciated by those skilled in the relevant arts, the use of sloping floor portions 29, 30, 32, 23, etc., can provide advantages such as lower thresholds for forward and rear doors 8, 10, by for example accommodating a front axle (not shown) supporting wheels disposed in wheel wells 24 and other apparatus beneath the floor sections of the cabin structure. The inventors have found that providing floor portions 29, 30, etc., at angles of between about 1 degree and 5 degrees, and preferably about 2 degrees, relative to main portions of the floor 11 provides desirable combinations of floor configuration and door thresholds in currently-common bus constructions. In particular, the sloping of such floor portions at such rates has been found to provide significantly improved door threshold heights without interfering with passenger movement within the bus.

The roof 2 upward of the upper floor section 10 can comprise a rear roof or ceiling section 33 including a central raised panel 34 having an underside surface disposed at a higher level than an underside surface of a forward roof section 35. The rear roof or ceiling section 33 can include an upwardly-rearwardly-sloped transition panel 36 between the central raised panel 34 and the forward roof section 35. The central raised panel 34 can includes a ventilation opening and/or emergency hatch 37. The roof or ceiling structure can include a pair of continuous longitudinal rails 42 spanning the forward roof section 35 and laterally bounding the central raised panel 34 and the transition panel 36. As will be understood by those skilled in the relevant arts, once they have been made familiar with this disclosure, by, for example, configuring the longitudinal rails 42 in a such that they are substantially horizontal and/or parallel to one or more of floor section(s) 10 and/or 11, as shown for example in FIG. 1, while providing transition panel 36 raised panel 34 above, for example, a central aisle provided between seats for passenger ingress and egress, various combinations of passenger convenience, structural strength, and pleasing aesthetic arrangements may be attained. The stanchions 43 can be positioned at any longitudinal location to the rails 42.

As shown in FIGS. 2 and 9, the curbside wall includes front and rear door frames 7-8. FIG. 9 shows the details of a top-rear corner of the front door frame 8 which is typical of the door frame construction, with a fore and aft pair of vertical door posts 40, and a horizontal door header 38 with rounded top corners merging the header 38 and door posts 40 in a continuously formed inverted U-shape. The pair of vertical door posts 40, and a horizontal door header 38 comprise a square tubular steel structural section, formed by cold rolling or bending, for example. Other vertical posts 39 and horizontal members 45 are welded to the door frame 8 to fabricate the curbside wall portion of the chassis frame. The right angle joints between the vertical posts 39 and the horizontal members 45 are welded and can be reinforced with a corner bracket 41 to reduce stress concentrations and the resultant metal fatigue. However the continuous rounded and formed top corners of the door frame 8 merging the door posts 40 and header 38 have been found to be structurally superior to a conventional right angle welded corner even though more effort is required. The door frame openings are substantial in size and bending stresses, induced by bus movements and collisions, tend to be concentrated at the top corners of the door frames 7, 8.

Although the above description relates to a specific preferred embodiment as presently contemplated by the inventor, it will be understood that the invention in its broad aspect includes mechanical and functional equivalents of the elements described herein.

We claim:

1. A bus cabin structure comprising:
a floor with an axially extending central aisle, the floor comprising: a lower floor section; and an upper floor section rearward of the lower floor section; the lower floor section comprising laterally spaced apart front wheel wells and a transversely extending raised portion between the front wheel wells having a top surface at a level above the lower floor section, a forward ramp and a rearward ramp, both the forward ramp and the rearward ramp extending between the top surface and the lower floor section;
a roof, a forward wall, a rear wall, curbside wall and driverside wall; wherein
the roof upward of the upper floor section comprises a rear roof section including a central raised panel having an underside surface disposed at a higher level than an underside surface of a forward roof section and an upwardly rearwardly sloped transition panel between the central raised panel and the forward roof section.

2. A bus cabin structure according to claim 1 wherein:
the roof includes a pair of continuous longitudinal rails spanning the forward roof section and laterally bounding the central raised panel and the transition panel, the longitudinal rails being disposed substantially parallel to at least one floor section of the bus cabin.

3. A bus cabin structure according to claim 1 wherein:
the forward portion of the lower floor section forward of the front wheel wells includes a front lateral aisle extending between a front door in the curbside wall and the central aisle, the front lateral aisle including a laterally downwardly sloping front ramp toward the front door.

\* \* \* \* \*